US010655547B2

(12) United States Patent
Kimura et al.

(10) Patent No.: US 10,655,547 B2
(45) Date of Patent: May 19, 2020

(54) INTERNAL COMBUSTION ENGINE (71) Applicant: TOYOTA JIDOSHA KABUSHIKI KAISHA, Toyota-shi, Aichi-ken (JP)

(72) Inventors: Koichi Kimura, Numazu (JP); Takuya Okubo, Susono (JP); Norihisa Nakagawa, Susono (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 90 days.

(21) Appl. No.: 15/172,685

(22) Filed: Jun. 3, 2016

(65) Prior Publication Data
US 2016/0356226 A1 Dec. 8, 2016

(30) Foreign Application Priority Data
Jun. 8, 2015 (JP) ................. 2015-115943

(51) Int. Cl.
*F02D 13/02* (2006.01)
*F01N 3/10* (2006.01)
(Continued)

(52) U.S. Cl.
CPC ....... *F02D 13/0261* (2013.01); *F01N 3/0814* (2013.01); *F01N 3/101* (2013.01); *F01N 9/00* (2013.01); *F02B 25/145* (2013.01); *F02D 41/0007* (2013.01); *F02D 41/0235* (2013.01); *F02D 41/405* (2013.01); *F01N 3/2033* (2013.01); *F01N 2560/025* (2013.01); *F01N 2900/08* (2013.01); *F02B 23/104* (2013.01); *F02B 2075/125* (2013.01); *F02D 2041/001* (2013.01); *F02D 2041/389* (2013.01); *Y02T 10/123* (2013.01); *Y02T 10/144* (2013.01); *Y02T 10/18* (2013.01); *Y02T 10/22* (2013.01); *Y02T 10/44* (2013.01); *Y02T 10/47* (2013.01)

(58) Field of Classification Search
CPC ............... F02D 13/0261; F02D 41/405; F02D 2041/001
See application file for complete search history.

(56) References Cited

U.S. PATENT DOCUMENTS

2009/0070014 A1* 3/2009 Miyashita ........... F02D 13/0261
701/105
2010/0101544 A1* 4/2010 Jung .................... F02D 41/0007
123/559.1
(Continued)

FOREIGN PATENT DOCUMENTS

DE   10 2004 001 249 A1   8/2005
EP          1 531 249 A2   5/2005
(Continued)

*Primary Examiner* — Patrick D Maines
(74) *Attorney, Agent, or Firm* — Hunton Andrews Kurth LLP (57) ABSTRACT

The internal combustion engine comprising: a catalyst arranged in an exhaust passage and able to store oxygen, a variable valve timing mechanism able to change a valve overlap amount between an intake valve and an exhaust valve, and a fuel supplying means for feeding fuel to the exhaust passage. The fuel supplying means feeds fuel to the exhaust passage only in an initial cycle after scavenging where valve overlap causes air to be expelled from an intake passage through a cylinder to the exhaust passage if such scavenging occurs.

12 Claims, 9 Drawing Sheets

(51) Int. Cl.
  *F02B 25/14* (2006.01)
  *F02D 41/00* (2006.01)
  *F02D 41/02* (2006.01)
  *F02D 41/40* (2006.01)
  *F01N 3/08* (2006.01)
  *F01N 9/00* (2006.01)
  *F01N 3/20* (2006.01)
  *F02D 41/38* (2006.01)
  *F02B 75/12* (2006.01)
  *F02B 23/10* (2006.01)

(56) References Cited

U.S. PATENT DOCUMENTS

2010/0263639 A1* 10/2010 Uhrich ............... F02D 41/0007
  123/564
2011/0247317 A1* 10/2011 Kondo ................. F01N 11/002
  60/274

FOREIGN PATENT DOCUMENTS

| EP | 2 674 602 A1 | 12/2013 |
| FR | 2 838 773 A1 | 10/2003 |
| JP | 2004-316553 A | 11/2004 |
| JP | 2008-101502 A | 5/2008 |
| JP | 2008-223678 A | 9/2008 |
| JP | 2013-238111 A | 11/2013 |

* cited by examiner

INTERNAL COMBUSTION ENGINE

CROSS-REFERENCE TO RELATED APPLICATION

The present application claims priority to Japanese Patent Application No. 2015-115943 filed on Jun. 8, 2015, which is incorporated herein by reference in its entirety.

TECHNICAL FIELD

The present invention relates to an internal combustion engine.

BACKGROUND ART

In an internal combustion engine, if generating valve overlap between intake valve and exhaust valve when the pressure inside an intake port is higher than the pressure inside an exhaust port, air is blown from the intake passage through the cylinder to the exhaust passage in what is known as "scavenging". For example, in an internal combustion engine provided with a supercharger such as a turbocharger, scavenging is intentionally caused if the amount of intake air is insufficient for the requested torque. By causing scavenging, the amount of exhaust gas increases and the speed of the turbine of the supercharger is raised. As a result, the pressure of the intake air is raised and the amount of intake air is increased.

Known in the past has been an internal combustion engine configured to provide an air-fuel ratio sensor at the upstream side of an exhaust purification catalyst in an exhaust passage of the internal combustion engine and control the amount of fuel fed to a combustion chamber of the internal combustion engine so that the output of this air-fuel ratio sensor matches a target air-fuel ratio (for example stoichiometric air-fuel ratio (14.6)) (for example, PLT 1).

In such control, during scavenging, the amount of fuel fed to a combustion chamber is controlled so that the average air-fuel ratio of the exhaust gas, including the air expelled from the intake passage through the cylinder to the exhaust passage, becomes a target air-fuel ratio. In this case, during scavenging, the air in the cylinder is decreased by the expulsion of air, so the combustion air-fuel ratio in the cylinder becomes richer than the target air-fuel ratio. Therefore, if valve overlap causes scavenging, in each cylinder, air will be expelled through the exhaust passage in the intake stroke and exhaust gas richer than the target air-fuel ratio will be exhausted into the exhaust passage in the exhaust stroke. In other words, the air-fuel ratio of the exhaust gas exhausted from each cylinder will alternately change between an air-fuel ratio leaner than the target air-fuel ratio and an air-fuel ratio richer than the target air-fuel ratio. In this case, the average air-fuel ratio of the exhaust gas exhausted from all of the cylinders will never greatly deviate from the target air-fuel ratio.

CITATION LIST

Patent Literature

PLT 1. Japanese Patent Publication No. 2013-238111A
PLT 2. Japanese Patent Publication No. 2008-223678A

SUMMARY OF INVENTION

Technical Problem

However, in each cylinder, in the exhaust stroke right before the intake stroke where scavenging initially occurs, the combustion gas of the air-fuel mixture in the state before the expulsion of air causes the combustion air-fuel ratio to become richer than the target air-fuel ratio, that is, exhaust gas of substantially the target air-fuel ratio, will be exhausted. Therefore, at each cylinder, when scavenging initially occurs, air is expelled through the exhaust passage in a state where there is no exhaust gas richer than the target air-fuel ratio present in the exhaust passage. For this reason, right after scavenging, the average air-fuel ratio of the exhaust gas exhausted from all of the cylinders becomes leaner than the target air-fuel ratio and the exhaust purification catalyst rapidly increases in oxygen storage amount. As a result, the exhaust purification catalyst is liable to fall in efficiency of removal of $NO_x$ and the exhaust emission is liable to deteriorate.

Further, right after scavenging, the output of an upstream side air-fuel ratio sensor arranged at an upstream side of the exhaust purification catalyst becomes leaner than the target air-fuel ratio. For this reason, if feedback control of the air-fuel ratio is performed based on the output of the upstream side air-fuel ratio sensor, the amount of fuel supplied to a combustion chamber will be increased. However, even if increasing the amount of fuel, a time lag occurs until the air-fuel ratio of the exhaust gas reaching the exhaust purification catalyst changes to the rich side. For this reason, even if using such feedback control, deterioration of the exhaust emission right after scavenging cannot be suppressed.

Therefore, in view of the above problem, an object of the present invention is to provide an internal combustion engine which can suppress the deterioration of exhaust emission immediately after scavenging.

Solution to Problem

In order to solve the above problem, in a first invention, there is provided an internal combustion engine comprising: a catalyst arranged in an exhaust passage and able to store oxygen, a variable valve timing mechanism able to change a valve overlap amount between an intake valve and an exhaust valve, and a fuel supplying means for feeding fuel to the exhaust passage, wherein the fuel supplying means feeds fuel to the exhaust passage only in an initial cycle after scavenging where valve overlap causes air to be expelled from an intake passage through a cylinder to the exhaust passage if such scavenging occurs.

In a second invention, the internal combustion engine comprises a plurality of cylinders, and the fuel supplying means supplies fuel to the exhaust passage when at least part of the plurality of cylinders are at an initial exhaust stroke after scavenging, in the first invention.

In a third invention, the fuel supplying means supplies fuel to the exhaust passage when each cylinder is at an initial exhaust stroke after scavenging, in the second invention.

In a forth invention, the internal combustion engine further comprises a scavenging amount calculating means for calculating a scavenging amount, and the amount of the fuel supplied by the fuel supplying means to the exhaust passage is an amount of fuel whereby an air-fuel ratio of an air-fuel mixture formed when supplying the amount of fuel with respect to the scavenging amount of air calculated by the scavenging amount calculating means becomes a target air-fuel ratio of exhaust gas flowing into the catalyst, in any one of the first to third inventions.

In a fifth invention, the scavenging control device increases the upper limit when an air-fuel ratio of the lean judged air-fuel ratio or more has not been detected by the downstream side air-fuel ratio sensor regardless of having controlled the valve overlap amount so that the scavenging amount becomes the upper limit, in any one of the first to fourth inventions.

Advantageous Effects of Invention

According to the present invention, there is provided an internal combustion engine which can suppress the deterioration of exhaust emission immediately after scavenging.

DESCRIPTION OF EMBODIMENTS

Below, referring to the drawings, embodiments of the present invention will be explained in detail.

First Embodiment

Figure 1:
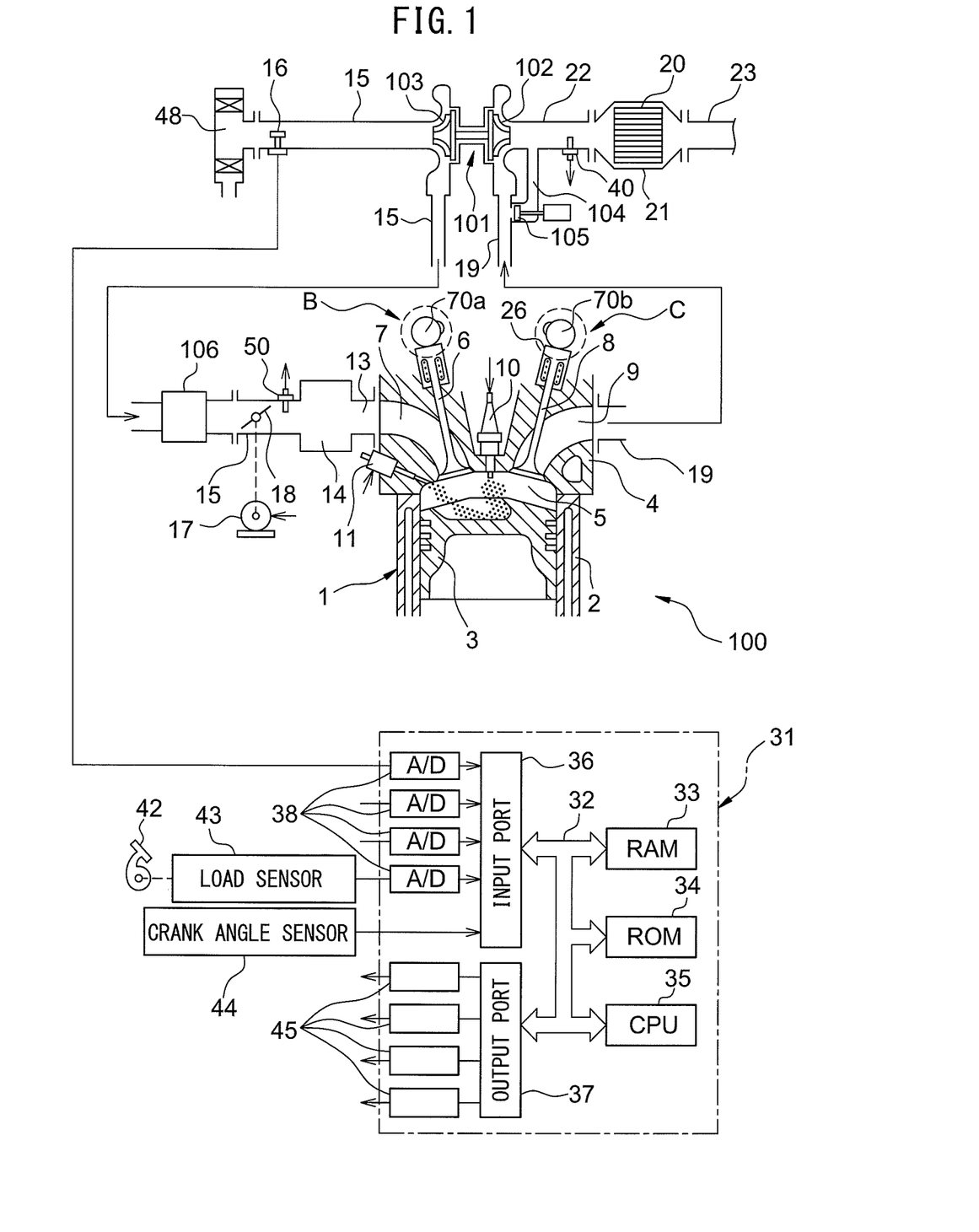
FIG. 1 is a schematic view of an internal combustion engine in an embodiment of the present invention.

First, referring to FIG. 1 to FIG. 8, a first embodiment of the present invention will be explained.
<Explanation of Internal Combustion Engine Overall>
FIG. 1 is a schematic view of an internal combustion engine 100 in an embodiment of the present invention. The internal combustion engine 100 is provided with an engine body 1 including a cylinder block 2 and a cylinder head 4. In the present embodiment, the internal combustion engine 100 is a spark ignition type internal combustion engine. Note that, the internal combustion engine 100 may also be a compression ignition type internal combustion engine (diesel engine). Inside of the cylinder block 2, piston 3 is arranged to reciprocate inside the cylinder block 2.

A combustion chamber 5 is formed between the piston 3 and the cylinder head 4. The cylinder head 4 is formed with intake ports 7 and exhaust ports 9. The intake ports 7 and exhaust ports 9 are connected to the combustion chambers 5. An intake valve 6 is arranged at an end part of each intake port 7 and is formed to be able to open and close the intake port 7. An exhaust valve 8 is arranged at an end part of each exhaust port 9 and is formed to be able to open and close the exhaust port 9. Further, the internal combustion engine 100 is provided with a variable valve timing mechanism B which can control the opening timing and the closing timing of each intake valve 6 and a variable valve timing mechanism C which can control the opening timing and the closing timing of each exhaust valve 8.

The internal combustion engine 100 is comprised of fuel injectors 11 for feeding fuel to the combustion chambers 5 and spark plugs 10 for igniting the air-fuel mixture at the combustion chambers 5. The spark plugs 10 are fastened to the cylinder head 4. The fuel injectors 11 are arranged at the circumferential parts of the inner wall surfaces in the cylinder head 4 so as to directly inject fuel into the combustion chambers 5. That is, the internal combustion engine 100 is a cylinder injection type of internal combustion engine. Further, the internal combustion engine 100 uses fuel constituted by gasoline which has a stoichiometric air-fuel ratio of 14.6. However, in the internal combustion engine 100, other fuel may also be used.

The internal combustion engine 100 is provided with a supercharger constituted by a turbocharger 101. The turbocharger 101 includes a turbine 102 which is arranged in the exhaust passage, a compressor 103 which is arranged in the intake passage, and a shaft which connects the turbine 102 and the compressor 103. If the flow of exhaust causes the turbine 102 to turn, the compressor 103 also turns and raises the pressure of the intake air. Therefore, the turbocharger 101 uses the energy of the exhaust gas to compress the intake air to increase the intake air amount.

The intake port 7 is connected through a corresponding intake runner 13 to a surge tank 14. The surge tank 14 is connected through an intake pipe 15 to an outlet part of the compressor 103 of the turbocharger 101. At the inside of the intake pipe 15 which connects the surge tank 14 and compressor 103, a throttle valve 18 which is driven by a throttle valve drive actuator 17 is arranged. The throttle valve 18 can change the opening area of the intake passage by being turned by the throttle valve drive actuator 17. Further, in the intake pipe 15 between the compressor 103 and throttle valve 18, a cooler (intercooler) 106 which cools the intake air which is compressed by the turbocharger 101 is arranged.

An inlet part of the compressor 103 is connected through the intake pipe 15 to an air cleaner 48. At the inside of the intake pipe 15 between the air cleaner 48 and compressor 103, an air flowmeter 16 which detects the amount of intake air is arranged. An intake port 7, intake runner 13, intake pipe 15, etc. define an intake passage which guides air to the combustion chamber 5.

On the other hand, the exhaust port 9 of each cylinder is connected to an exhaust manifold 19. The exhaust manifold 19 has a plurality of runners which are connected to the exhaust ports 9 and a header at which these runners are collected. The header of the exhaust manifold 19 is connected to the inlet part of the turbine 102 of the turbocharger 101. The outlet part of the turbine 102 is connected through an exhaust pipe 22 to a casing 21. The casing 21 has an exhaust purification catalyst 20 built into it. The casing 21 is connected to the exhaust pipe 23. An exhaust port 9, exhaust manifold 19, exhaust pipes 22, 23, etc. define an exhaust passage which discharges the exhaust gas which is produced due to combustion of the air-fuel mixture from a combustion chamber 5.

Further, inside the exhaust pipe 22 between the turbine 102 and the casing 21, an upstream side air-fuel ratio sensor 40 which detects the air-fuel ratio of the exhaust gas which flows through the inside of the exhaust pipe 22 (that is, the exhaust gas which flows into the exhaust purification catalyst 20) is arranged. Note that the air-fuel ratio sensor 40 may be arranged at the upstream side of the turbine 102.

Between the exhaust manifold 19 upstream of the turbine 102 and the exhaust pipe 22 downstream of the turbine 102, a bypass passage 104 which bypasses the turbine 102 is arranged. At the bypass passage 104, a bypass valve which opens and closes the bypass passage 104 constituted by a wastegate valve 105 is arranged. By adjusting the opening degree of the wastegate valve 105, the amount of exhaust gas which runs through the turbine 102 can be adjusted. Therefore, by controlling the wastegate valve 105, the pressure of the intake air (supercharging pressure) can be controlled. Note that, the supercharging pressure control means which is used to control the supercharging pressure may be any mechanism besides a wastegate valve 105.

The internal combustion engine 100 is provided with a pressure acquiring means for acquiring the supercharging pressure. The pressure acquiring means is for example a supercharging pressure sensor 50. The supercharging pressure sensor 50 is arranged in the intake passage at the downstream side from the throttle valve 18. Note that, the supercharging pressure is estimated from the operating state etc. of the internal combustion engine 100.

The internal combustion engine 100 is provided with an electronic control unit 31 (ECU) which is comprised of a digital computer. The ECU 31 includes components which are connected with each other through bidirectional buses 32, such as a RAM (random access memory) 33, ROM (read only memory) 34, CPU (microprocessor) 35, input port 36, and output port 37.

The output signal of the air flowmeter 16 is input through a corresponding AD converter 38 to the input port 36. The internal combustion engine 100 is provided with an accelerator pedal 42. The accelerator pedal 42 has a load sensor 43 connected to it. The load sensor 43 generates an output voltage which is proportional to the amount of depression of the accelerator pedal 42. The output voltage of the load sensor 43 is input through a corresponding AD converter 38 to the input port 36.

The internal combustion engine 100 is provided with a crank angle sensor 44. The crank angle sensor 44 for example generates an output pulse every time the crankshaft rotates by a predetermined angle. This output pulse is input to the input port 36. In the CPU 35, the engine speed is calculated from the output pulse of this crank angle sensor 44. Further, the output of the crank angle sensor 44 can be used to detect the crank angle. The outputs of the supercharging pressure sensor 50 and air-fuel ratio sensor 40 are respectively input through corresponding AD converters 38 to the input port 36.

The output port 37 of the ECU 31 is connected through corresponding drive circuits 45 to the spark plugs 10, fuel injectors 11, throttle valve drive actuator 17, wastegate valve 105, and variable valve timing mechanisms B and C. The ECU 31 can control the ignition timings of the spark plugs 10, the fuel injection timings and fuel injection amounts of the fuel injectors 11, the opening degree of the throttle valve 18, the opening degree of the wastegate valve 105, the opening timings and the closing timings of the intake valves 6, and the opening timings and the closing timings of the exhaust valves 8.

<Explanation of Exhaust Purification Catalyst>

The exhaust purification catalyst 20 is three-way catalysts which have oxygen storage abilities. Specifically, the exhaust purification catalyst 20 is comprised of carriers which are comprised of ceramic on which a precious metal which has a catalytic action (for example, platinum (Pt)) and a substance which has an oxygen storage ability (for example, ceria ($CeO_2$)) are carried. The exhaust purification catalysts 20 and 24 exhibit a catalytic action of simultaneously removing unburned gas (HC, CO, etc.) and nitrogen oxides ($NO_x$) when reaching a predetermined activation temperature and, in addition, an oxygen storage ability.

According to the oxygen storage ability of the exhaust purification catalyst 20, the exhaust purification catalyst 20 stores the oxygen in the exhaust gas when the air-fuel ratio of the exhaust gas which flows into the exhaust purification catalyst 20 is leaner than the stoichiometric air-fuel ratio (lean air-fuel ratio). On the other hand, the exhaust purification catalyst 20 releases the oxygen which is stored in the exhaust purification catalyst 20 when the inflowing exhaust gas has an air-fuel ratio which is richer than the stoichiometric air-fuel ratio (rich air-fuel ratio).

Figure 2A:
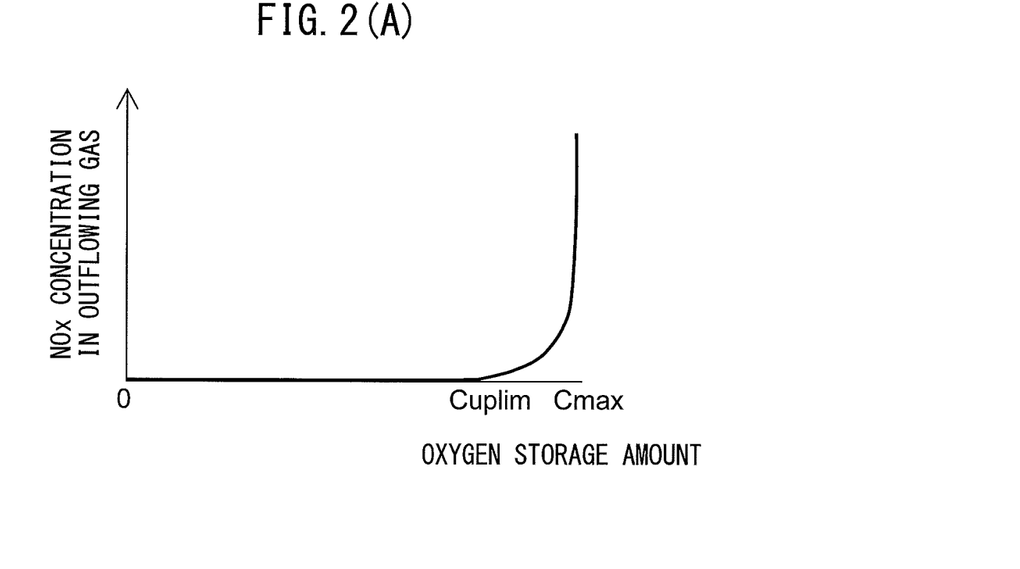
FIG. 2A is a view showing the relationship between an oxygen storage amount of an exhaust purification catalyst and NOx concentration in exhaust gas flowing out from the exhaust purification catalyst.

The exhaust purification catalysts 20 has a catalytic action and oxygen storage ability and thereby have the action of removing $NO_x$ and unburned gas according to the stored amount of oxygen. That is, as shown in FIG. 2A, if the air-fuel ratio of the exhaust gas which flows into the exhaust purification catalyst 20 is a lean air-fuel ratio, when the stored amount of oxygen is small, the exhaust purification catalyst 20 stores the oxygen in the exhaust gas. Further, along with this, the $NO_x$ in the exhaust gas is removed by reduction. Further, if the stored amount of oxygen becomes larger, the exhaust gas which flows out from the exhaust purification catalyst 20 rapidly rises in concentration of oxygen and $NO_x$ at a certain stored amount near the maximum storable oxygen amount Cmax (in the figure, Cuplim).

Figure 2B:
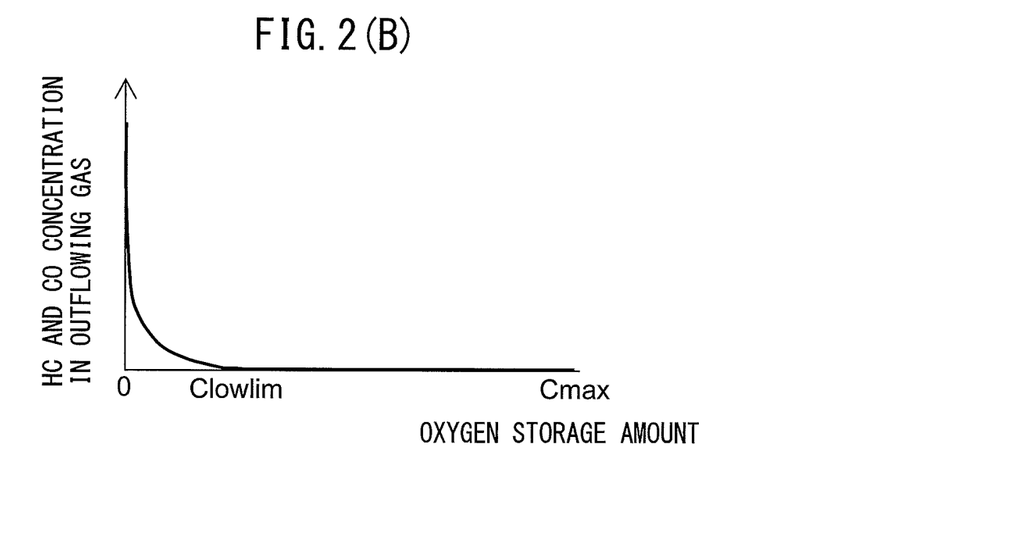
FIG. 2B is a view showing the relationship between an oxygen storage amount of an exhaust purification catalyst and HC and CO concentration in exhaust gas flowing out from the exhaust purification catalyst.

On the other hand, as shown in FIG. 2B, if the air-fuel ratio of the exhaust gas which flows into the exhaust purification catalyst 20 is the rich air-fuel ratio, when the stored amount of oxygen is large, the oxygen which is stored in the exhaust purification catalyst 20 is released, and the unburned gas in the exhaust gas is removed by oxidation. Further, if the stored amount of oxygen becomes small, the exhaust gas which flows out from the exhaust purification catalyst 20 rapidly rises in concentration of unburned gas at a certain stored amount near zero (in the figure, Clowlim).

In the above way, according to the exhaust purification catalyst 20 which are used in the present embodiment, the characteristics of removal of $NO_x$ and unburned gas in the exhaust gas change depending on the air-fuel ratio of the exhaust gas which flows into the exhaust purification catalyst 20 and stored amount of oxygen. Note that, if having a catalytic action and oxygen storage ability, the exhaust purification catalyst 20 may also be catalysts different from the three-way catalyst.

<Characteristics of Air-Fuel Ratio Sensor>

Figure 3:
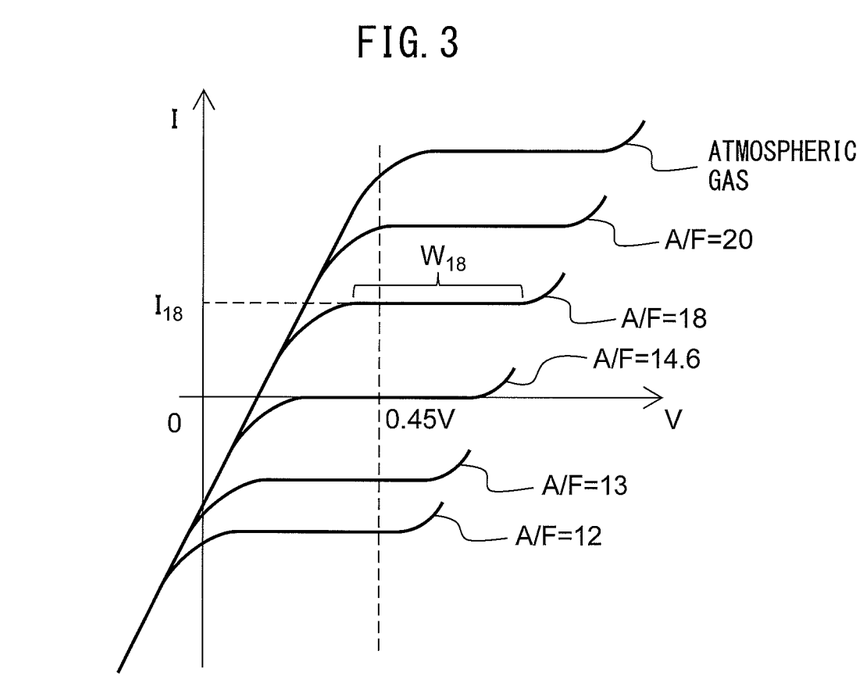
FIG. 3 is a view showing a relationship between a sensor applied voltage and an output current at each exhaust air-fuel ratio.
Figure 4:
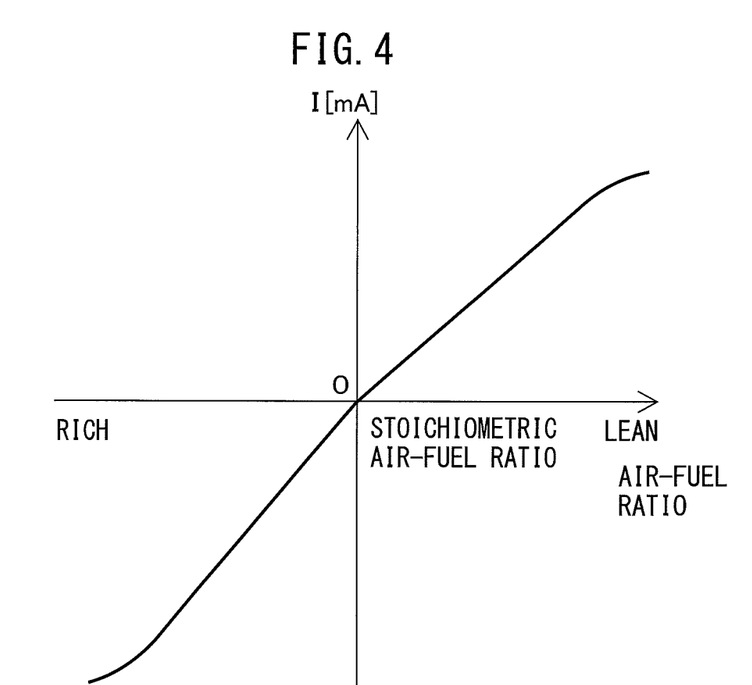
FIG. 4 is a view showing a relationship between an exhaust air-fuel ratio and output current when making the sensor applied voltage constant.

The air-fuel ratio sensor 40 has a voltage-current (V-I) characteristic such as shown in FIG. 3. As will be understood from FIG. 3, an output current I becomes larger the higher the exhaust air-fuel ratio (A/F) (the leaner). Further, the V-I line at each exhaust air-fuel ratio has a region parallel to the V-axis, that is, a region where even if the sensor applied voltage changes, the output current does not change much at all. This voltage region is called the "limit current region". The current at this time is called the "limit current". In FIG. 4, the limit current region and the limit current when the exhaust air-fuel ratio is 18 are respectively shown by $W_{18}$ and $I_{18}$.

Figure 5A:
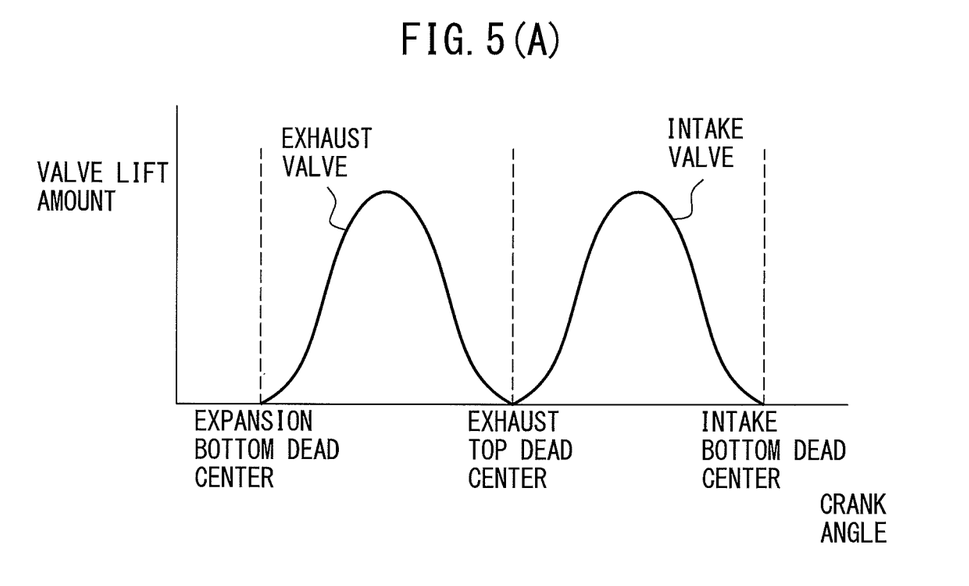
FIG. 5A is a view schematically showing an example of opening time periods of an exhaust valve and intake valve.

FIG. 4 is a view showing a relationship between an exhaust air-fuel ratio and an output current I when making an applied voltage constant at about 0.45V. As will be understood from FIG. 5, at the air-fuel ratio sensor 40, the higher the exhaust air-fuel ratio (that is, the leaner), the larger the output current I from the air-fuel ratio sensor 40. In addition, the air-fuel ratio sensor 40 is configured so that when the exhaust air-fuel ratio is the stoichiometric air-fuel ratio, the output current I becomes zero. Therefore, the air-fuel ratio sensor 40 can continuously (linearly) detect the exhaust air-fuel ratio. Note that, when the exhaust air-fuel ratio becomes larger by more than a certain extent or when it becomes smaller by more than a certain extent, the ratio of the change of the output current to the change of the exhaust air-fuel ratio becomes smaller. Note that, the air-fuel ratio sensor 40 may also be an air-fuel ratio sensor other than a limit current type.

<Basic Air-Fuel Ratio Control>

The internal combustion engine 100 is further provided with an air-fuel ratio control device. The air-fuel ratio control device controls the amount of fuel supplied to the combustion chamber 5, that is, a fuel injection amount from the fuel injector 11, by feedback based on an output air-fuel ratio of the air-fuel ratio sensor 40 so that the output air-fuel ratio of the air-fuel ratio sensor 40 becomes a target air-fuel ratio. The target air-fuel ratio is for example the stoichiometric air-fuel ratio (14.6). Note that, the output air-fuel ratio means the air-fuel ratio corresponding to the output value of the air-fuel ratio sensor.

Note that, the target air-fuel ratio does not have to be made constant and may also be changed according to the operating state etc. For example, the target air-fuel ratio may be alternately switched between an air-fuel ratio leaner than the stoichiometric air-fuel ratio and an air-fuel ratio richer than the stoichiometric air-fuel ratio. In this case, the target air-fuel ratio may be set based on the output air-fuel ratio of the downstream side air-fuel ratio sensor (not shown) arranged at the downstream side of the exhaust purification catalyst 20. The downstream side air-fuel ratio sensor detects the air-fuel ratio of the exhaust gas flowing out from the exhaust purification catalyst 20.

<Scavenging>

In this regard, if generating valve overlap between intake valve 6 and exhaust valve 8 when the pressure inside the intake port 7 (intake pressure) is higher than the pressure inside the exhaust port 9 (exhaust pressure), air will be blown from the intake passage through the cylinder to the exhaust passage as scavenging. Note that, "valve overlap between the intake valve and the exhaust valve" means the partial overlap of the opening time period of the intake valve 6 and the opening time period of the exhaust valve 8. The ECU 31 can control at least one of the variable valve timing mechanism B of the intake valve 6 and the variable valve timing mechanism C of the exhaust valve 8 so as to cause valve overlap and can change the valve overlap amount (that is, time period during which intake valve 6 and exhaust valve 8 are both opened). Specifically, the valve overlap amount is changed by at least one of changing the opening timing of the intake valve 6 and changing the closing timing of the exhaust valve 8.

Figure 5B:
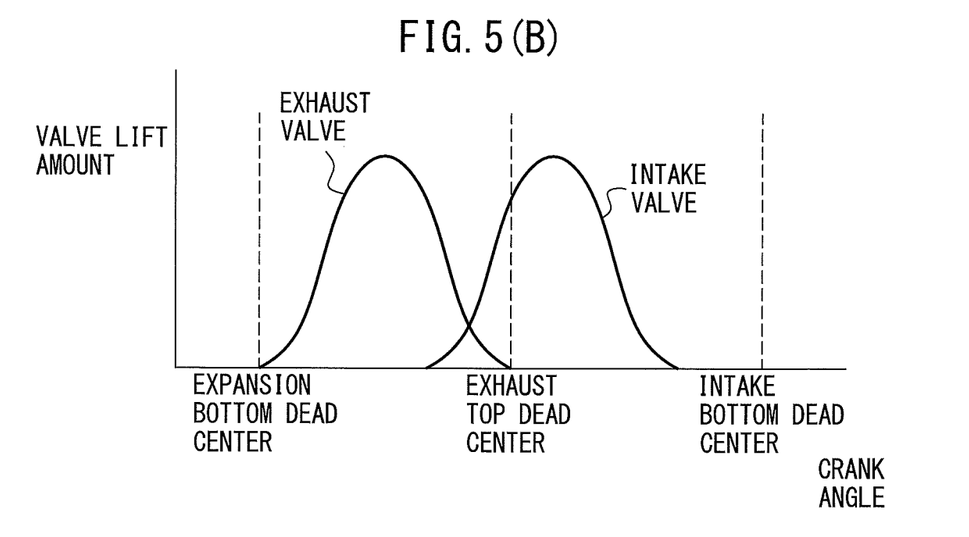
FIG. 5B is a view schematically showing an example of opening time periods of an exhaust valve and intake valve.

FIGS. 5A and 5B are views schematically showing examples of opening time periods of the exhaust valve 8 and intake valve 6. In the example shown in FIG. 5A, the closing timing of the exhaust valve 8 and the opening timing of the intake valve 6 match at exhaust top dead center so valve overlap does not occur. In the example shown in FIG. 5B, the opening time period of the exhaust valve 8 and the opening time period of the intake valve 6 overlap and valve overlap occurs.

For example, if the amount of intake air is insufficient for the requested torque, scavenging is used. By causing scavenging, the amount of exhaust gas increases and the speed of the turbine 102 of the turbocharger 101 is raised. As a result, the pressure of the intake air (supercharging pressure) is raised and the amount of intake air is made to increase.

<Problems in Control of Air-Fuel Ratio Right After Scavenging>

During scavenging, the amount of fuel supplied to the combustion chamber 5 is controlled so that an average air-fuel ratio of the exhaust gas, including air expelled from the intake passage through a cylinder to the exhaust passage, becomes the target air-fuel ratio. In this case, during scavenging, the expulsion of air causes the air in a cylinder to decrease, so the combustion air-fuel ratio in the cylinder becomes richer than the target air-fuel ratio. Therefore, if valve overlap causes scavenging, at each cylinder, air is expelled through the exhaust passage at the intake stroke and exhaust gas richer than the target air-fuel ratio is discharged into the exhaust passage at the exhaust stroke. In other words, the air-fuel ratio of the exhaust gas exhausted from each cylinder alternately changes between an air-fuel ratio leaner than the target air-fuel ratio and an air-fuel ratio richer than the target air-fuel ratio. In this case, the average air-fuel ratio of the exhaust gas discharged from all cylinders will never greatly deviate from the target air-fuel ratio.

However, at each cylinder, in the exhaust stroke right before the intake stroke where scavenging first occurs, combustion gas of the air-fuel mixture in the state before the expulsion of air causes the combustion air-fuel ratio to become richer than the target air-fuel ratio, that is, exhaust gas of substantially the target air-fuel ratio, is exhausted. Therefore, when scavenging first occurs at each cylinder, air is expelled to the exhaust passage in the state with no exhaust gas richer than the target air-fuel ratio present in the exhaust passage. For this reason, right after scavenging, the average air-fuel ratio of the exhaust gas discharged from all cylinders becomes leaner than the target air-fuel ratio, and the exhaust purification catalyst 20 rapidly increases in the oxygen storage amount. As a result, the exhaust purification catalyst 20 is liable to fall in the efficiency of removal of $NO_x$ and the exhaust emission is liable to deteriorate.

Further, right after scavenging, the output of the air-fuel ratio sensor 40 becomes leaner than the target air-fuel ratio. For this reason, the amount of fuel supplied to the combustion chamber 5 is increased by feedback control of the air-fuel ratio based on the output of the air-fuel ratio sensor 40. However, even if increasing the amount of fuel, a time lag occurs before the air-fuel ratio of the exhaust gas reaching the exhaust purification catalyst 20 changes to the rich side. For this reason, even with such feedback control, deterioration of the exhaust emission right after scavenging cannot be suppressed.

<Air-Fuel Ratio Control During Scavenging>

Therefore, in the internal combustion engine 100, if valve overlap causes scavenging, fuel is supplied to the exhaust passage only at the initial cycle after scavenging. If the fuel supplied to the exhaust passage reaches the exhaust purification catalyst 20, oxygen stored at the exhaust purification catalyst 20 is released. For this reason, in the present embodiment, by supplying fuel to the exhaust passage right after scavenging, it is possible to keep the expulsion of air right after scavenging from causing the exhaust purification catalyst 20 to rapidly increase in the oxygen storage amount and in turn keep the exhaust emission from deteriorating right after scavenging. Note that, in this Description, the "initial cycle after scavenging" means a single cycle comprised of the stroke at which scavenging initially occurs and the three strokes following that stroke.

The internal combustion engine 100 comprises a fuel supplying means for supplying fuel to the exhaust passage for performing the above control. The fuel supplying means is, for example a cylinder fuel injector 11 directly injecting fuel into a cylinder. The cylinder fuel injector 11 can inject fuel in the exhaust stroke to thereby supply fuel (unburned fuel) to the exhaust passage. Note that, the fuel supplying means may be an exhaust fuel injector (not shown) arranged at the exhaust passage at the upstream side of the exhaust purification catalyst 20, for example, arranged at the exhaust port 9. The exhaust fuel injector can directly supply fuel to the exhaust passage. Further, when the fuel supplying means is an exhaust fuel injector, the internal combustion engine 100 may be a port injection type internal combustion engine. In this case, the fuel injector is arranged near the intake port 7 so as to inject fuel into the intake port 7.

The internal combustion engine 100 further comprises a scavenging amount calculating means for calculating the scavenging amount. The amount of fuel supplied by the fuel supplying means to the exhaust passage is the amount of fuel so that the air-fuel ratio of the air-fuel mixture formed when that amount of fuel is supplied with respect to the scavenging amount of air calculated by the scavenging amount calculating means becomes the target air-fuel ratio of the exhaust gas flowing into the exhaust purification catalyst 20. Due to this, it is possible to make the exhaust air-fuel ratio right after scavenging approach the target air-fuel ratio.

<Explanation of Air-Fuel Ratio Control During Scavenging Using Time Chart>

Figure 6:
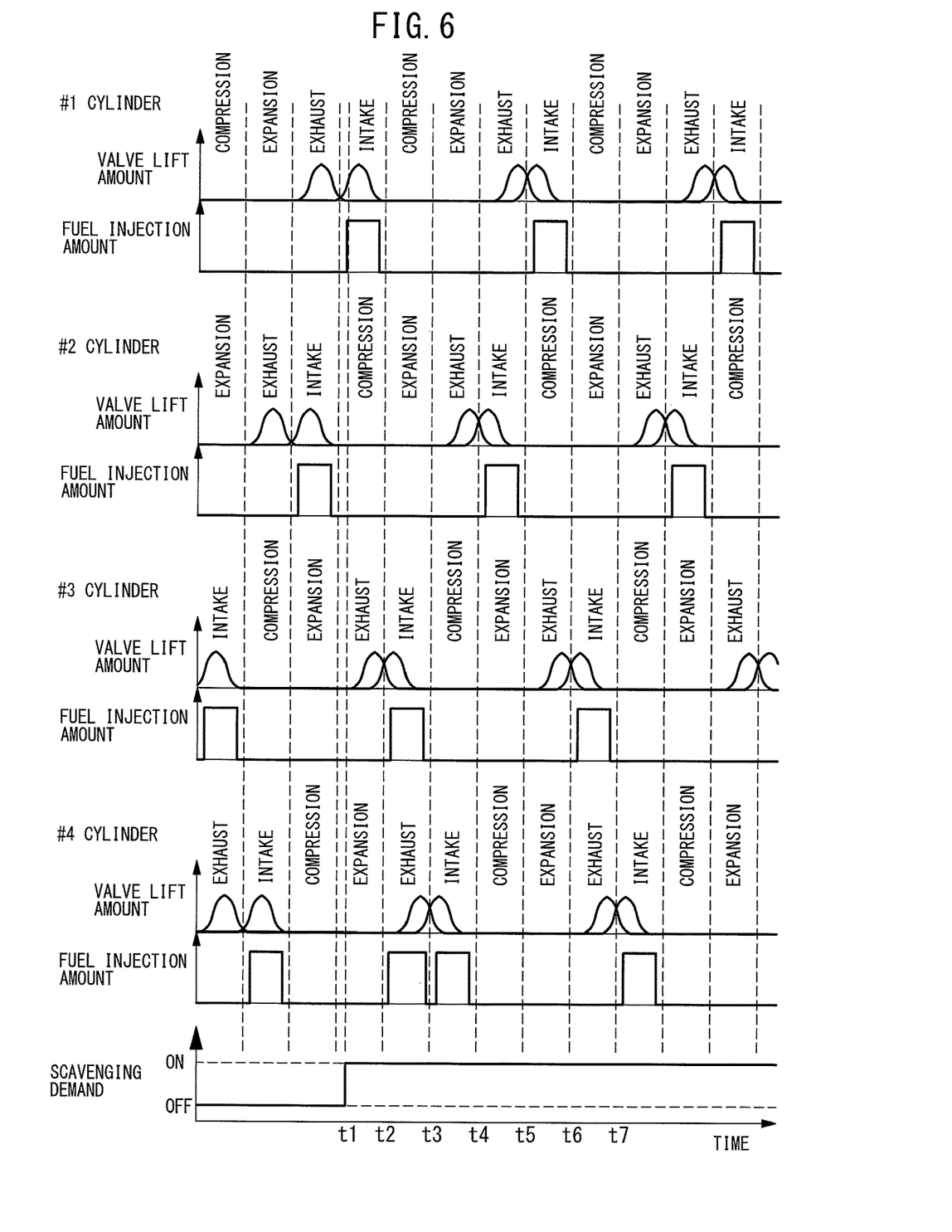
FIG. 6 is a time chart of a fuel injection amount and valve lift amounts of an exhaust valve and intake valve at each cylinder in the case where scavenging occurs.

Referring to FIG. 6, the above-mentioned control will be explained in detail. FIG. 6 is a time chart of the fuel injection amounts and the valve lift amounts of the exhaust valve 8 and intake valve 6 at the #1 cylinder, the #2 cylinder, the #3 cylinder, and the #4 cylinder in the case of scavenging occurring. In the example of FIG. 6, the internal combustion engine 100 comprises the four cylinders of the #1 cylinder, the #2 cylinder, the #3 cylinder, and the #4 cylinder. Further, in the example of FIG. 6, the engine speed of the internal combustion engine 100 is made constant.

In the example of FIG. 6, before the time t1, scavenging is not demanded, so at each cylinder, almost no valve overlap occurs. Further, before the time t1, at each cylinder, fuel is injected by a fuel injector 11 into a cylinder only in the intake stroke at each cycle.

If scavenging is demanded at the time t1, the valve overlap amount at each cylinder is made to increase. In the example of FIG. 6, the variable valve timing mechanism C retards the phase angle of the exhaust valve 8 and the variable valve timing mechanism B advances the phase angle of the intake valve 6 whereby the valve overlap amount is made to increase. Note that, in this Description, the "phase angle" means the angle at the center of the operating angle.

In the example of FIG. 6, scavenging initially occurs at the intake stroke of the #3 cylinder between the time t2 and the time t3. After that, scavenging occurs in the intake stroke of the #4 cylinder between the time t3 and the time t4, scavenging occurs in the intake stroke of the #2 cylinder between the time t4 and the time t5, and scavenging occurs in the intake stroke of the #1 cylinder between the time t5 and the time t6.

At each cylinder, in the exhaust stroke right before the intake stroke where scavenging initially occurs, combustion gas of an air-fuel mixture in a state before the combustion air-fuel ratio becomes richer than the target air-fuel ratio due to the expulsion of the air is exhausted. Therefore, in the exhaust stroke of the #3 cylinder between the time t1 and the time t2, the exhaust stroke of the #4 cylinder between the time t2 and the time t3, the exhaust stroke of the #2 cylinder between the time t3 and the time t4, and the exhaust stroke of the #1 cylinder between the time t4 and the time t5, exhaust gas of substantially the target air-fuel ratio is exhausted into the exhaust passage.

If air is expelled through an exhaust passage in the state where there is no exhaust gas richer than the target air-fuel ratio in the exhaust passage, the exhaust purification catalyst 20 will rapidly increase in oxygen storage amount. Therefore, in the example of FIG. 6, in the exhaust stroke of the #4 cylinder between the time t2 and the time t3, that is, at the initial exhaust stroke at all cylinders after scavenging, fuel is injected by the fuel injector 11 into the cylinder. As a result, fuel is supplied to the exhaust passage. The amount of fuel supplied to the exhaust passage at this time is the estimated value of the total of the amounts of air expelled by scavenging at each cylinder at the initial cycle after scavenging (scavenging amount) divided by the target air-fuel ratio of the exhaust gas flowing into the exhaust purification catalyst 20 (for example stoichiometric air-fuel ratio (14.6)). Note that, "the first cycle after the scavenging", in the example of FIG. 6, is one cycle in each cylinder between the time t2 and the time t6.

By feeding the above amount of fuel into the exhaust passage, even if air is expelled from each cylinder in the first cycle after the scavenging, the exhaust air-fuel ratio can be made to approach the target air-fuel ratio. As a result, the exhaust purification catalyst 20 is kept from rapidly increasing in oxygen storage amount right after scavenging and in turn the exhaust emission is kept from deteriorating right after scavenging.

Note that, the fuel may also be supplied to the exhaust passage at an exhaust stroke of other than the #4 cylinder at the initial cycle after scavenging. Specifically, the fuel may also be supplied at the exhaust stroke at the #2 cylinder between the time t3 and the time t4, the exhaust stroke at the #1 cylinder between the time t4 and the time t5, or the exhaust stroke at the #3 cylinder between the time t5 and the time t6. That is, in the present embodiment, the fuel supplying means supplies fuel to the exhaust passage when at least part of the cylinders among the plurality of cylinders are in the first exhaust stroke after scavenging.

In the example of FIG. 6, after the initial cycle after scavenging, that is, after the time t6 as well, scavenging continues to occur. For example, scavenging occurs at the intake stroke of the #3 cylinder between the time t6 and the time t7. However, in the exhaust stroke of the #3 cylinder right before this intake stroke, exhaust gas made rich in combustion air-fuel ratio in the cylinder due to the expulsion of air is discharged. Therefore, in the initial cycle after scavenging and on, air is expelled from each cylinder in the state where exhaust gas richer than the target air-fuel ratio is present at the exhaust passage, so the expulsion of air is kept from causing the exhaust purification catalyst 20 to rapidly increase in oxygen storage amount.

Note that, the air-fuel ratio control device may make the target air-fuel ratio after scavenging richer than the target air-fuel ratio before scavenging. By doing this, the combustion air-fuel ratio in a cylinder during scavenging becomes richer, so at the initial cycle after scavenging and on, the exhaust purification catalyst 20 can be more effectively kept from rapidly increasing in oxygen storage amount.

<Control Routine of Air-Fuel Ratio Control During Scavenging>

Figure 7:
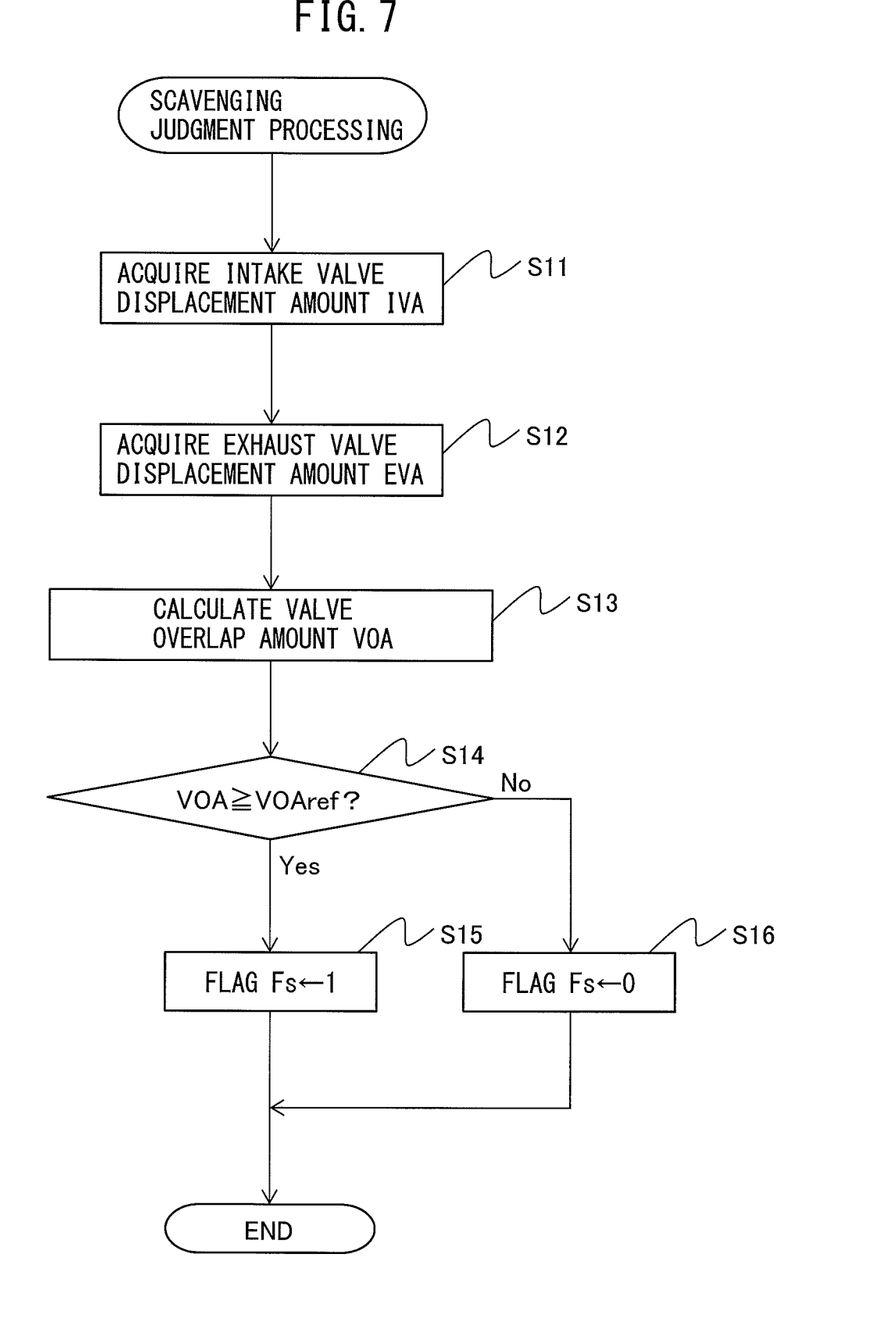
FIG. 7 is a flow chart showing a control routine of processing for judging scavenging in a first embodiment of the present invention.

Next, referring to the flow charts of FIG. 7 and FIG. 8, the control of the air-fuel ratio during scavenging will be explained in detail. FIG. 7 is a flow chart showing the control routine of processing for judgment of scavenging in the first embodiment of the present invention. The illustrated control routine is executed by interruption at constant time intervals so as to judging the occurrence of scavenging.

First, at step S11, an intake valve displacement amount IVA is acquired. The intake valve displacement amount IVA is the amount of change from the initial value of the opening timing of the intake valve 6. The sign of the intake valve displacement amount IVA is made plus when the opening timing of the intake valve 6 is advanced from the initial value and is made minus when the opening timing of the intake valve 6 is retarded from the initial value.

Next, at step S12, an exhaust valve displacement amount EVA is acquired. The exhaust valve displacement amount EVA is the amount of change from the initial value of the closing timing of the exhaust valve 8. The sign of the exhaust valve displacement amount EVA is made plus when the closing timing of the exhaust valve 8 is retarded from the initial value and is made minus when the closing timing of the exhaust valve 8 is advanced from the initial value.

Next, at step S13, the valve overlap amount between the intake valve 6 and the exhaust valve 8 is calculated. The valve overlap amount VOA is, for example, calculated by the following formula (1):

$$VOA = INT + IVA + EVA \tag{1}$$

Here, INT indicates the initial value of the valve overlap amount.

Next, at step S14, it is judged if the valve overlap amount VOA calculated at step S13 is a predetermined valve overlap reference amount VOAref or more. The valve overlap reference amount VOAref is the minimum value of the valve overlap amount wherein it is estimated that scavenging will occur, and is found by experiments or calculation. If it is judged that the valve overlap amount VOA is the valve overlap reference amount VOAref or more, the routine proceeds to step S15. At step S15, the scavenging judgment flag Fs is set to "1". The scavenging judgment flag Fs is set to zero when it is estimated that scavenging has not occurred and is set to "1" when it is estimated that scavenging will occur. After step S15, the present control routine is ended.

On the other hand, if, at step S14, it is judged that the valve overlap amount VOA is less than the valve overlap reference amount VOAref, the routine proceeds to step S16. At step S16, the scavenging judgment flag Fs is set to zero. After step S16, the present control routine is ended.

Figure 8:
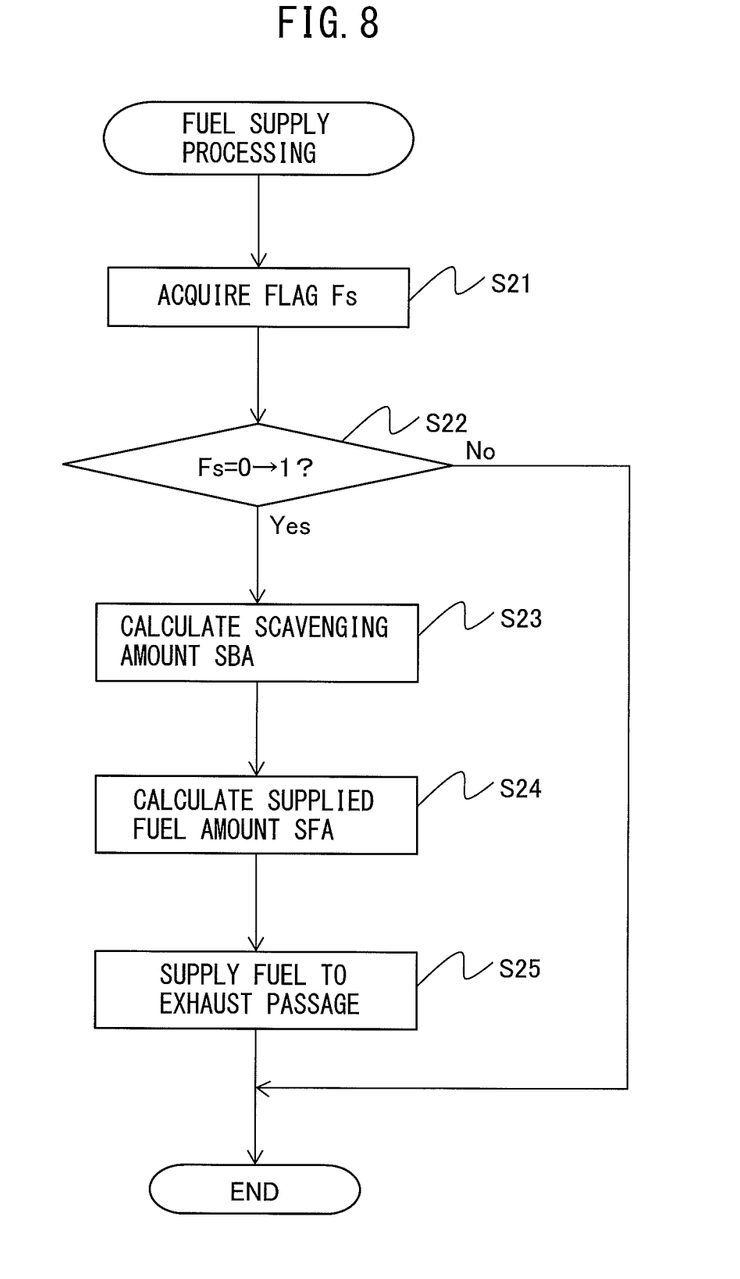
FIG. 8 is a flow chart showing a control routine of processing for supplying fuel in the first embodiment of the present invention.

FIG. 8 is a flow chart showing a control routine of processing for supplying fuel in the first embodiment of the present invention. The illustrated control routine is executed by interruption at constant time intervals.

First, at step S21, a scavenging judgment flag Fs is acquired. Next, at step S22, it is judged if the scavenging judgment flag Fs has changed from zero to "1". If the scavenging judgment flag Fs acquired at step S21 of the previous control routine is zero and the scavenging judgment flag Fs acquired at step S21 of the current control routine is "1", it is judged that the scavenging judgment flag Fs has changed from zero to "1" and the routine proceeds to step S23. On the other hand, if it is judged that the scavenging judgment flag Fs has not changed from zero to "1", fuel is not supplied to the exhaust passage and the present control routine is ended.

At step S23, the scavenging amount SBA per one cylinder is calculated. The scavenging amount SBA is, for example, calculated based on the valve overlap amount VOA, differential pressure between the intake pressure and exhaust pressure, engine speed, and intake air amount. The valve overlap amount VOA is calculated at step S13 of the control routine of FIG. 7. The engine speed is calculated from the output of the crank angle sensor 44, while the intake air amount is detected by the air flow meter 16.

The intake pressure is, for example, directly detected by a supercharging sensor 50 or is calculated by known model calculations based on the output of an intake temperature sensor provided in the intake passage at the downstream side of the throttle valve 18, the output of the air flow meter 16, the opening degree of the throttle valve 18, etc. The exhaust pressure is, for example, directly detected by an exhaust pressure sensor provided at the exhaust manifold 19 or is calculated based on a map shown as a function of the engine speed and intake pressure. Specifically, in the above map, the exhaust pressure is shown as becoming higher the higher the engine speed and is shown as becoming higher the higher the intake pressure.

Further, the scavenging amount SBA may be calculated based on a map shown as a function of the valve overlap amount VOA, differential pressure of the intake pressure and exhaust pressure, engine speed, and intake air amount. Specifically, in the above map, the scavenging amount SBA is shown as becoming larger the larger the valve overlap amount VOA, is shown as becoming larger the larger the differential pressure of the intake pressure and the exhaust pressure, is shown as becoming larger the lower the engine speed, and is shown as becoming larger the larger the intake air amount.

Next, at step S24, the amount of fuel to be supplied to the exhaust passage, that is, the supplied fuel amount SFA, is calculated. The supplied fuel amount SFA is for example calculated by the following formula (2):

$$SFA = SBA/TAF \times CN \tag{2}$$

Here, TAF indicates the target air-fuel ratio of the exhaust gas flowing into the exhaust purification catalyst 20 (for example stoichiometric air-fuel ratio (14.6)), while CN indicates the number of cylinders of the internal combustion engine 100.

Next, at step S25, fuel of the supplied fuel amount SFA calculated at step S24 is supplied by the fuel supplying means to the exhaust passage. The fuel supplying means is the cylinder fuel injector 11 or exhaust fuel injector. The fuel is supplied to the exhaust passage only at the initial cycle after scavenging. For example, the fuel is supplied to the exhaust passage when at least part of the cylinders among the plurality of cylinders are in the initial exhaust stroke after scavenging. Note that, the fuel may also be supplied to the exhaust passage a plurality of times at the initial cycle after scavenging. In this case, in one fuel supply operation, an amount of fuel of the supplied fuel amount SFA divided by the number of times of supply is supplied to the exhaust passage. After step S25, the present control routine is ended.

Second Embodiment

Next, referring to FIG. 9 and FIG. 10, a second embodiment of the present invention will be explained. Note that the configuration and control of the internal combustion engine of the second embodiment are basically the same as the internal combustion engine of the first embodiment, so in the following explanation, mainly parts differing from the first embodiment will be explained.

If the fuel supplied to the exhaust passage at the initial cycle after scavenging is small, the amount of oxygen released from the exhaust purification catalyst 20 due to the supplied fuel becomes smaller, so it is not possible to effectively suppress a rapid increase in oxygen storage amount of the exhaust purification catalyst 20 due to the expulsion of air. On the other hand, if a large amount of fuel is supplied to the exhaust passage at the initial cycle after scavenging, the exhaust purification catalyst 20 rapidly decreases in oxygen storage amount, so unburned gas is liable to flow out from the exhaust purification catalyst 20.

Therefore, in the second embodiment, the fuel supplying means supplies fuel to the exhaust passage when each cylinder is in the initial exhaust stroke after scavenging. The amount of fuel supplied at each exhaust stroke is the estimated value of the amount of air expelled due to the scavenging at each cylinder at the initial cycle after scavenging (scavenging amount) divided by the target air-fuel ratio of the exhaust gas flowing into the exhaust purification catalyst 20 (for example, the stoichiometric air-fuel ratio (14.6)). In the second embodiment, a suitable amount of fuel corresponding to the scavenging amount is supplied at a timing at which air is expelled from each cylinder, so exhaust emission right after scavenging can be more effectively suppressed.

<Explanation of Air-Fuel Ratio Control During Scavenging Using Time Chart>

Figure 9:
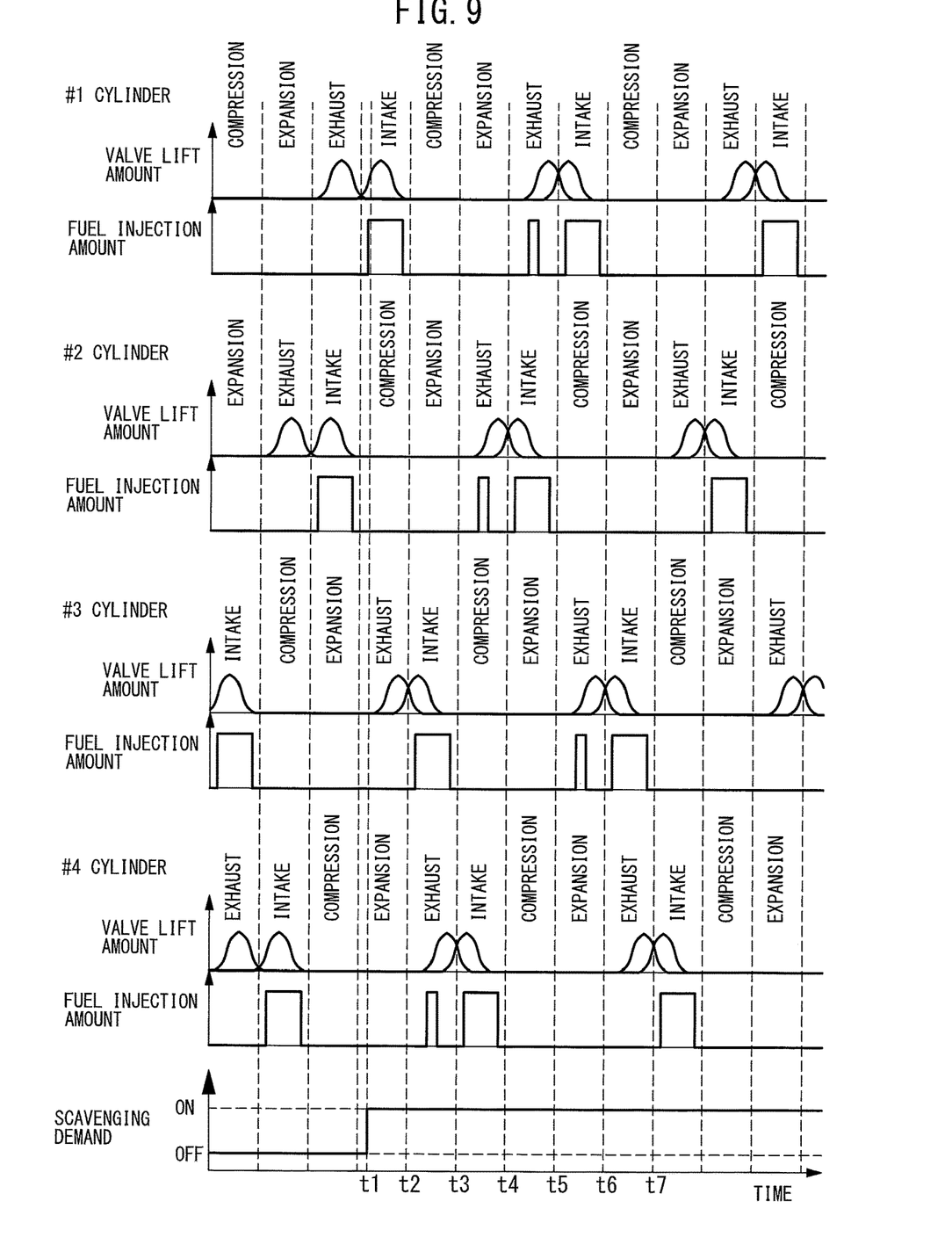
FIG. 9 is a time chart of a fuel injection amount and valve lift amounts of an exhaust valve and intake valve at each cylinder in the case where scavenging occurs.

Referring to FIG. 9, the above-mentioned control will be explained in detail. FIG. 9 is a time chart of the fuel injection amounts and the valve lift amounts of the exhaust valve 8 and intake valve 6 at the #1 cylinder, the #2 cylinder, the #3 cylinder, and the #4 cylinder in the case of scavenging occurring. In the example of FIG. 9, the internal combustion engine 100 comprises the four cylinders of the #1 cylinder, the #2 cylinder, the #3 cylinder, and the #4 cylinder. Further, in the example of FIG. 9, the engine speed of the internal combustion engine 100 is made constant.

In the example of FIG. 9, before the time t1, scavenging is not demanded, so at each cylinder, almost no valve overlap occurs. Further, before the time t1, at each cylinder, fuel is injected by the fuel injector 11 into the cylinder only at the intake stroke at each cycle.

If scavenging is demanded at the time t1, the valve overlap amount at each cylinder is made to increase. In the example of FIG. 9, scavenging first occurs at the intake stroke of the #3 cylinder between the time t2 and the time t3. After that, scavenging occurs at the intake stroke of the #4 cylinder between the time t3 and the time t4, scavenging occurs at the intake stroke of the #2 cylinder between the time t4 and the time t5, and scavenging occurs at the intake stroke of the #1 cylinder between the time t5 and the time t6.

Further, at the exhaust stroke of the #4 cylinder between the time t2 and the time t3, at the exhaust stroke of the #2 cylinder between the time t3 and the time t4, at the exhaust stroke of the #1 cylinder between the time t4 and the time t5, and at the exhaust stroke of the #3 cylinder between the time t5 and the time t6, that is, at the initial exhaust stroke at each cylinder after scavenging, fuel is injected by the fuel injector 11 into the cylinder. As a result, fuel is supplied into the exhaust passage.

In the example of FIG. 9, at the intake stroke of the #3 cylinder between the time t2 and the time t3, scavenging occurs, while at the exhaust stroke of the #4 cylinder, fuel is injected. At the intake stroke of the #4 cylinder between the time t3 and the time t4, scavenging occurs, while at the exhaust stroke of the #2 cylinder, fuel is injected. At the intake stroke of the #2 cylinder between the time t4 and the time t5, scavenging occurs, while at the exhaust stroke of the #1 cylinder, fuel is injected. At the intake stroke of the #1 cylinder between the time t5 and the time t6, scavenging occurs, while at the exhaust stroke of the #3 cylinder, fuel is injected. As a result, if air is expelled from the #3 cylinder, fuel is supplied from the #4 cylinder, if air is expelled from the #4 cylinder, fuel is supplied from the #2 cylinder, if air is expelled from the #2 cylinder, fuel is supplied from the #1 cylinder, and if air is expelled from the #1 cylinder, fuel is supplied from the #3 cylinder. Therefore, the expulsion of air from each cylinder right after scavenging can be effectively kept from causing the exhaust purification catalyst 20 to rapidly increase in oxygen storage amount.

Further, the amount of fuel supplied to the exhaust passage at each exhaust stroke is the estimated value of the amount of air expelled by the scavenging at each cylinder at the initial cycle after scavenging (scavenging amount) divided by the target air-fuel ratio of the exhaust gas flowing into the exhaust purification catalyst 20 (for example stoichiometric air-fuel ratio (14.6)). By doing this, it is possible to make the exhaust air-fuel ratio right after scavenging approach the target air-fuel ratio. Note that, the "initial cycle after scavenging", in the example of FIG. 9, is one cycle at each cylinder between the time t2 to the time t6.

<Control Routine of Air-Fuel Ratio Control During Scavenging>

Next, referring to the flow charts of FIG. 7 and FIG. 10, the air-fuel ratio control during scavenging in the second embodiment will be explained in detail. In the second embodiment as well, in the same way as the first embodiment, the control routine shown in FIG. 7 is performed so as to judge the occurrence of scavenging.

Figure 10:
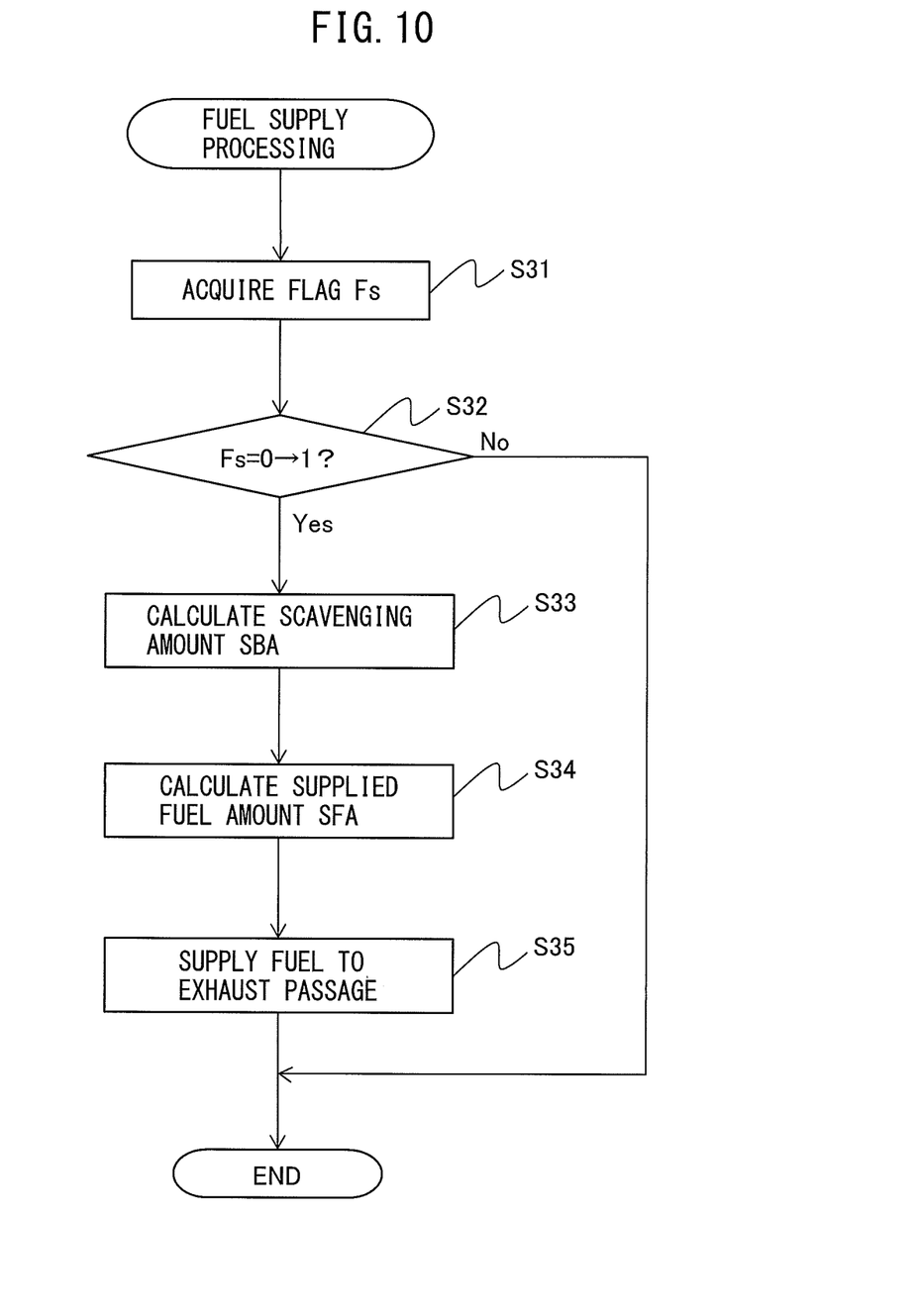
FIG. 10 is a flow chart showing a control routine of processing for judging scavenging in a second embodiment of the present invention.

FIG. 10 is a flow chart showing a control routine of processing for supplying fuel in the second embodiment of the present invention. The illustrated control routine is executed by interruption at constant time intervals.

Step S31 to step S33 are similar to step S21 to step S23 in FIG. 8, so explanations will be omitted.

At step S34 after step S33, the amount of fuel supplied to the exhaust passage, that is, the supplied fuel amount SFA, is calculated. The supplied fuel amount SFA is, for example, calculated by the following formula (3).

$$SFA = SBA/TAF \quad (3)$$

Here, TAF indicates the target air-fuel ratio of the exhaust gas flowing into the exhaust purification catalyst 20 (for example stoichiometric air-fuel ratio (14.6)).

Next, at step S35, fuel of the supplied fuel amount SFA calculated at step S34 is supplied by the fuel supplying means to the exhaust passage. The fuel supplying means is the cylinder fuel injector 11 or exhaust fuel injector. The fuel is supplied to the exhaust passage when each cylinder is in the initial exhaust stroke after scavenging. After step S35, the present control routine is ended.

Note that, all of the above-mentioned control routines are controlled by the ECU 31 of the internal combustion engine 100.

Above, preferred embodiments according to the present invention were explained, but the present invention is not limited to these embodiments and can be corrected and modified in various ways within the scope of the claims.

REFERENCE SIGNS LIST 1. engine body
5. combustion chamber
6. intake valve
8. exhaust valve
11. fuel injector
18. throttle valve
20. exhaust purification catalyst
31. ECU
40. air-fuel ratio sensor
100. internal combustion engine
B, C. variable valve timing mechanism

The invention claimed is:

1. An internal combustion engine comprising:
a catalyst arranged in an exhaust passage and able to store oxygen,
a variable valve timing mechanism capable of changing an amount of valve overlap between an intake valve and an exhaust valve, and
a fuel supplying injector capable of feeding fuel to the exhaust passage, and
an electronic control unit (ECU), wherein
the ECU is configured to control the fuel supplying injector to feed the fuel to the exhaust passage only in an initial cycle after scavenging when air is expelled from the intake passage through a cylinder to the exhaust passage due to the occurrence of the valve overlap.

2. The internal combustion engine according to claim 1, wherein
the internal combustion engine comprises a plurality of cylinders, and
the ECU is configured to control the fuel supplying injector to feed the fuel to the exhaust passage when at least part of the plurality of cylinders are at an initial exhaust stroke after scavenging.

3. The internal combustion engine according to claim 2, wherein
the ECU is further configured to calculate a scavenging amount, and
the amount of the fuel supplied by the fuel supplying injector to the exhaust passage is an amount of fuel whereby an air-fuel ratio of an air-fuel mixture formed when supplying the amount of fuel with respect to the scavenging amount of air calculated by the ECU becomes a target air-fuel ratio of exhaust gas flowing into the catalyst.

4. The internal combustion engine according to claim 2, wherein the fuel supplying injector is a cylinder fuel injector injecting fuel into a combustion chamber.

5. The internal combustion engine according to claim 3, wherein the fuel supplying injector is a cylinder fuel injector injecting fuel into a combustion chamber.

6. The internal combustion engine according to claim 2, wherein the ECU is configured to control the fuel supplying injector to feed the fuel to the exhaust passage when each cylinder is at an initial exhaust stroke after scavenging.

7. The internal combustion engine according to claim 6, wherein
the ECU is further configured to calculate a scavenging amount, and
the amount of the fuel supplied by the fuel supplying injector to the exhaust passage is an amount of fuel whereby an air-fuel ratio of an air-fuel mixture formed when supplying the amount of fuel with respect to the scavenging amount of air calculated by the ECU becomes a target air-fuel ratio of exhaust gas flowing into the catalyst.

8. The internal combustion engine according to claim 7, wherein the fuel supplying injector is a cylinder fuel injector injecting fuel into a combustion chamber.

9. The internal combustion engine according to claim 6, wherein the fuel supplying injector is a cylinder fuel injector injecting fuel into a combustion chamber.

10. The internal combustion engine according to claim 1, wherein
the ECU is further configured to calculate a scavenging amount, and
the amount of the fuel supplied by the fuel supplying injector to the exhaust passage is an amount of fuel whereby an air-fuel ratio of an air-fuel mixture formed when supplying the amount of fuel with respect to the scavenging amount of air calculated by the ECU becomes a target air-fuel ratio of exhaust gas flowing into the catalyst.

11. The internal combustion engine according to claim 10, wherein the fuel supplying injector is a cylinder fuel injector injecting fuel into a combustion chamber.

12. The internal combustion engine according to claim 1, wherein the fuel supplying injector is a cylinder fuel injector injecting fuel into a combustion chamber.

* * * * *